J. U. COATES.
FIRE BALLOON FOR SEARCHLIGHT PRACTICE AND FOR OTHER PURPOSES.
APPLICATION FILED OCT. 1, 1917.

1,332,107. Patented Feb. 24, 1920.

INVENTOR
John Unett Coates
BY
ATTORNEY

J. U. COATES.
FIRE BALLOON FOR SEARCHLIGHT PRACTICE AND FOR OTHER PURPOSES.
APPLICATION FILED OCT. 1, 1917.
1,332,107. Patented Feb. 24, 1920.
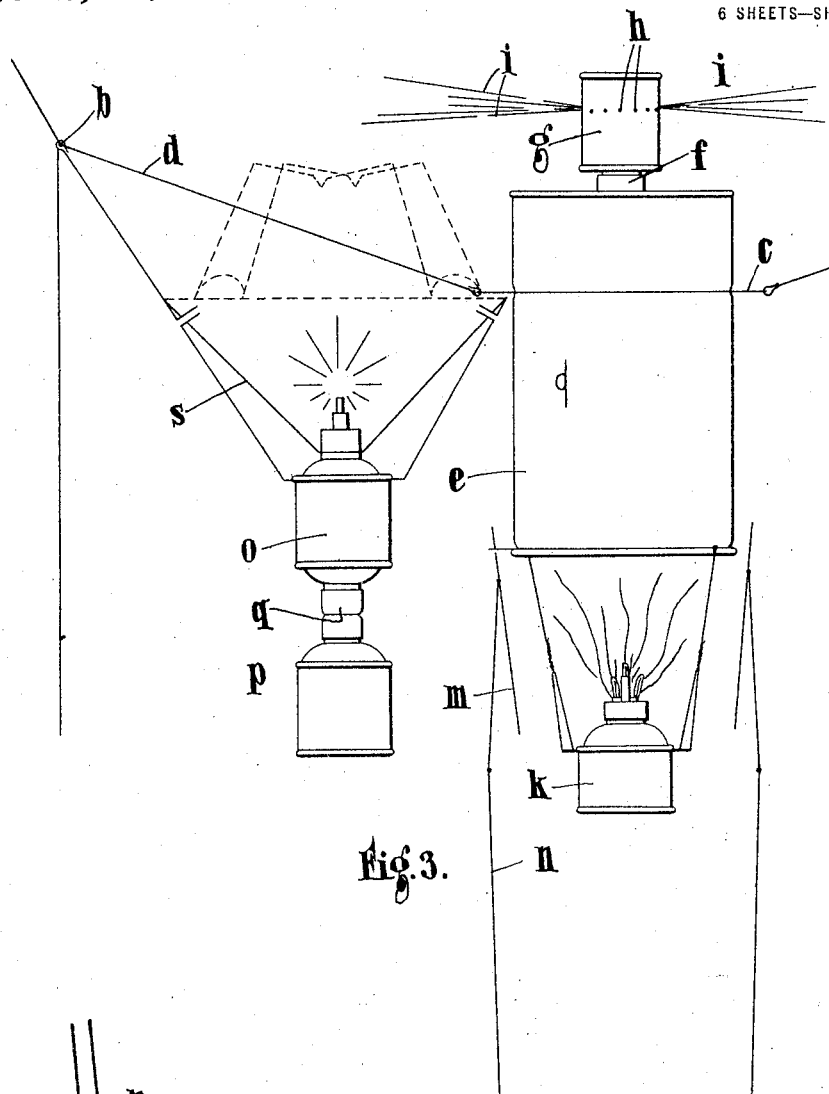
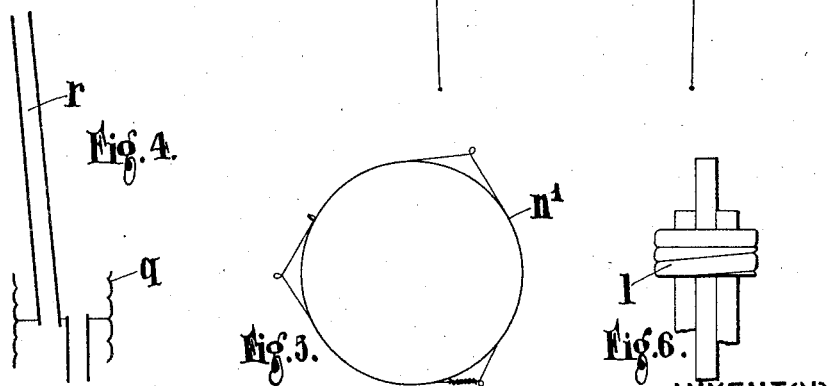
INVENTOR
John Unett Coates
BY
ATTORNEY

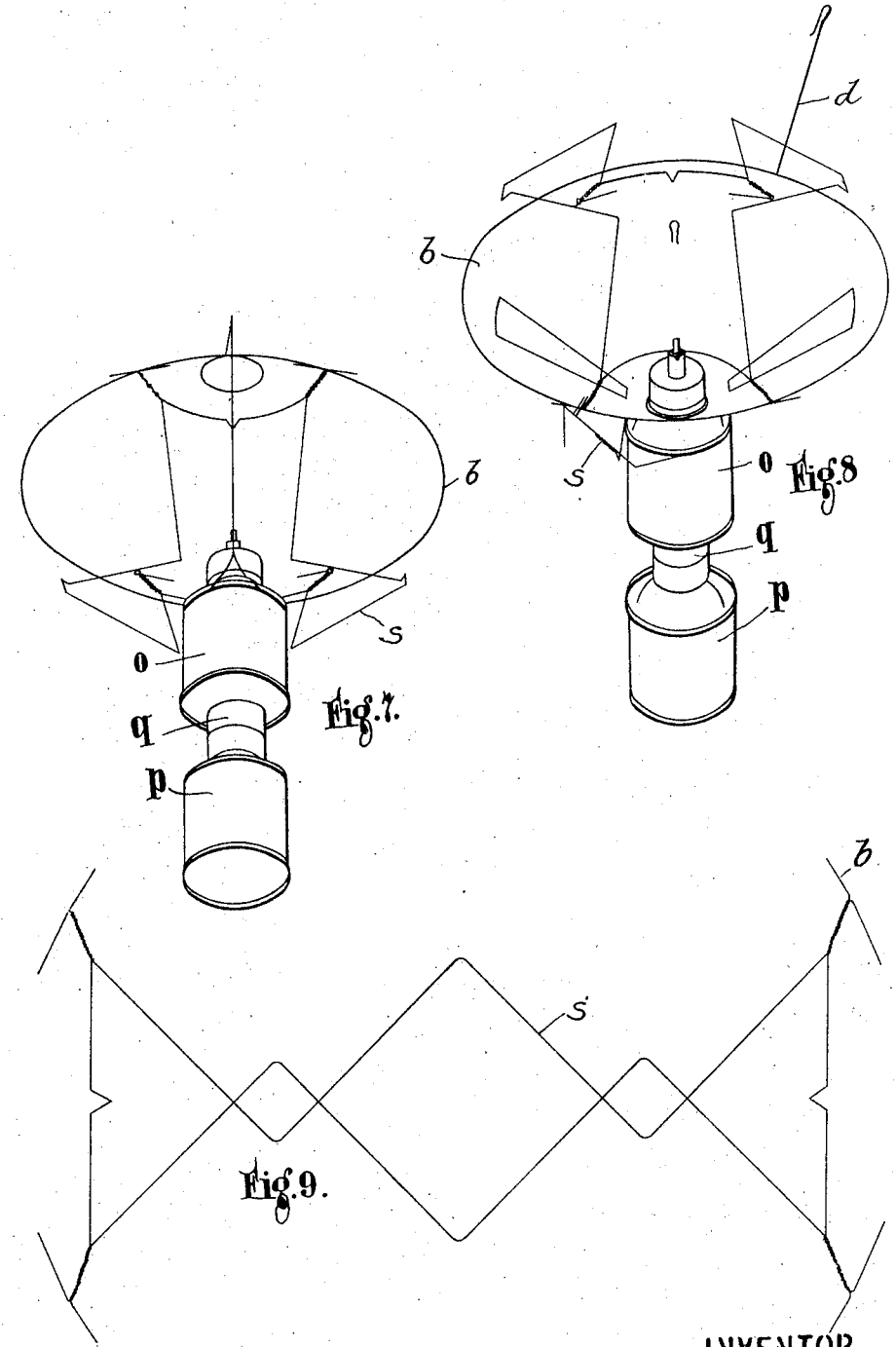

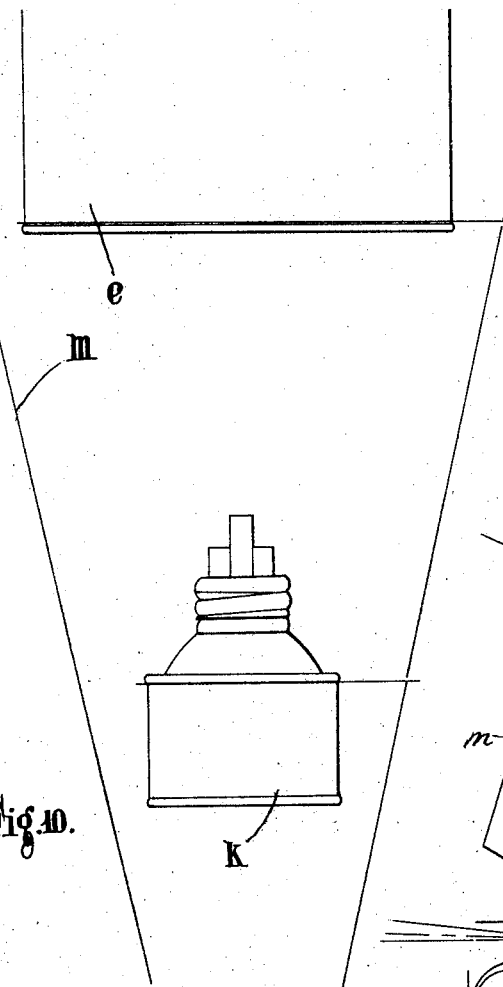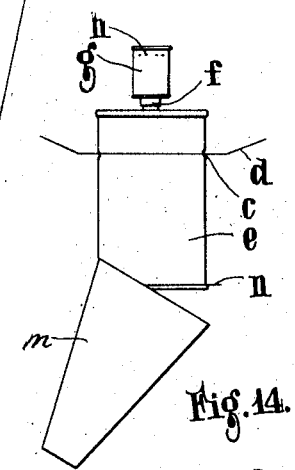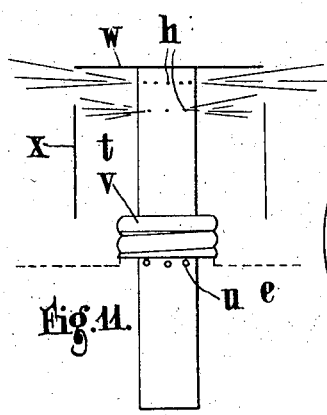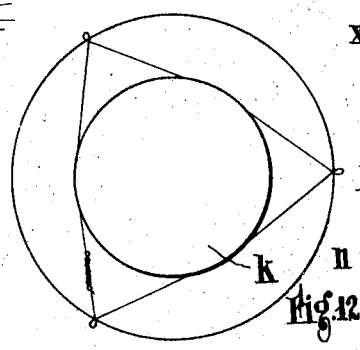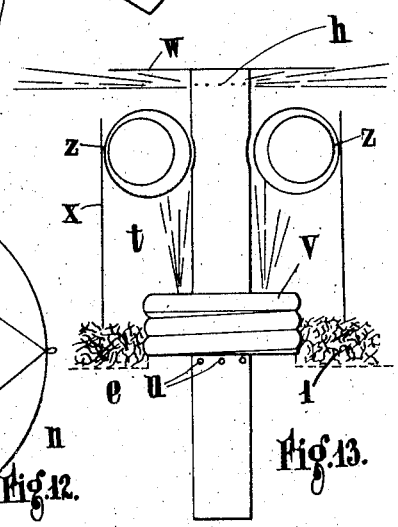

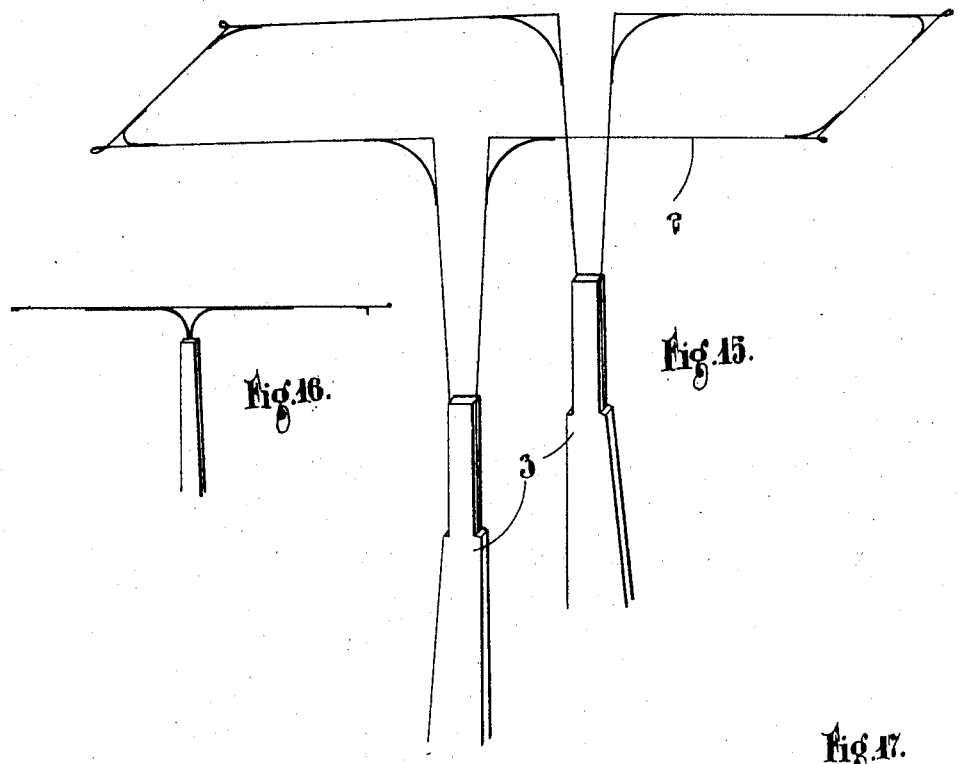
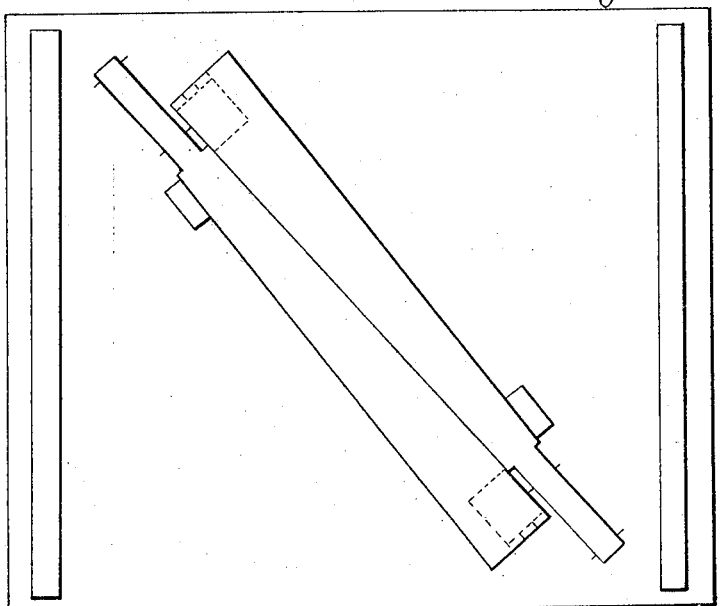

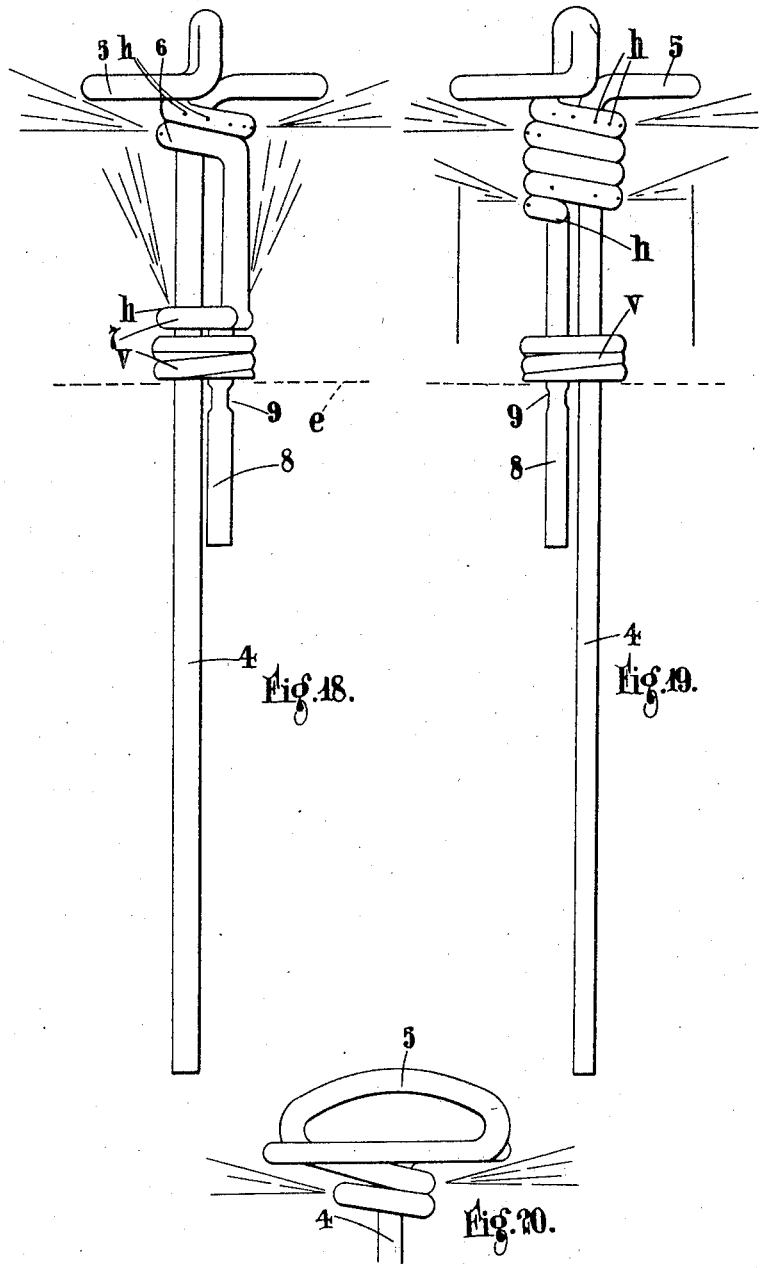

UNITED STATES PATENT OFFICE.

JOHN UNETT COATES, OF EXETER, ENGLAND.

FIRE-BALLOON FOR SEARCHLIGHT PRACTICE AND FOR OTHER PURPOSES.

1,332,107.  Specification of Letters Patent.  Patented Feb. 24, 1920.

Application filed October 1, 1917. Serial No. 194,286.

*To all whom it may concern:*

Be it known that I, JOHN UNETT COATES, a subject of the King of Great Britain and Ireland, and residing at Newport House, Countess Wear, Exeter, in the county of Devon, England, have invented a certain new and useful Improved Fire-Balloon for Searchlight Practice and for other Purposes, of which the following is a specification.

This invention relates to fire balloons of the kind provided with means for heating the air or gas within the balloon casing by means of hydrocarbon or other suitable fuel adapted to be vaporized in and to issue from a vessel or receptacle, and while the invention is particularly designed to provide a balloon suitable for facilitating practice with searchlights, it will be clear that the balloon may be employed for signaling, meteorological observation and other purposes.

The object of the present invention is to provide a simple, cheap and efficient device of this nature and the invention consists in a fire balloon of the type referred to provided with a heating device comprising a reservoir containing methylated spirit or other suitable liquid hydrocarbon or other fuel, and provided with fine apertures through which the vapor of such fuel may issue to be burnt as it emerges, and a burner external to, but in association with, said reservoir for the purpose of vaporizing the hydrocarbon therein.

The invention also consists in a fire balloon having the features referred to above, in which the burner is provided with a plurality of wicks of varying lengths, whereby the height to which the balloon will rise will be automatically regulated in a predetermined manner.

The invention also consists in combination with a burner as above described of a wind screen to facilitate the starting of the apparatus.

The invention further comprises other details and arrangements hereinafter more particularly referred to.

The accompanying drawings illustrate one mode of carrying out the invention:—

Fig. 3 shows on a larger scale one arrangement of lamp in accordance with the invention;

Figs. 4, 5 and 6 illustrate details;

Figs. 7 and 8 show the illuminating lamp in perspective;

Fig. 9 is a developed view of a part shown in Figs. 7 and 8;

Figs. 10, 11, 12 and 13 show a modified arrangement of burner;

Fig. 14 shows one position of the arrangement of Fig. 10 on a smaller scale;

Fig. 15 shows a starting frame for the balloon;

Fig. 16 is an alternative form;

Fig. 17 shows the lid of the balloon box;

Figs. 18, 19 and 20 are views showing alternative forms of burner in accordance with my invention.

Figures 1, 2:
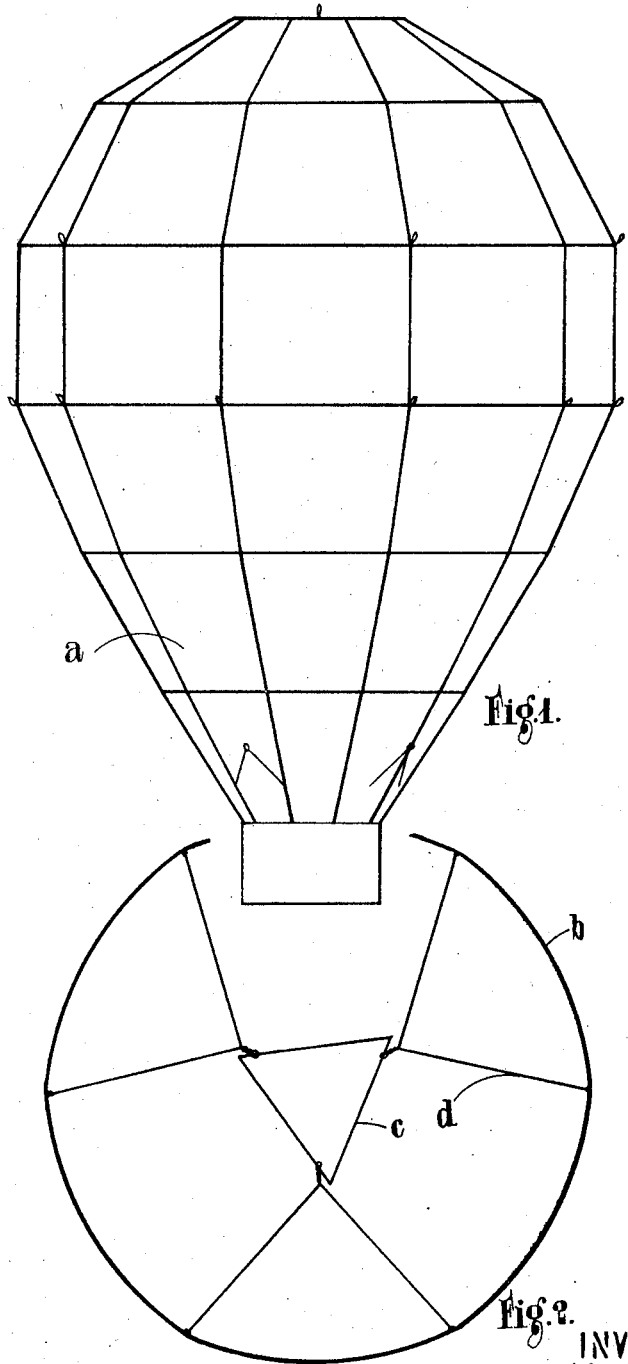
Figure 1 shows in elevation one form of balloon casing.
Fig. 2 shows the foundation ring on a larger scale.

In carrying my invention into effect in one convenient manner I form my improved balloon with an envelop or casing $a$ of tissue paper or other suitable light and flexible material of convenient size and shape and mounted upon a light wire or other framework, the latter being preferably formed with a foundation ring $b$ of wire, in the center of which is fitted a second smaller ring $c$ of triangular or other suitable shape connected flexibly to the outer ring by wire or like stays $d$.

The heating apparatus (Fig. 3) which is supported upon the inner ring $c$ by hook-like or other supports, or by the grip of the ring in a groove or depression around the apparatus or in any other suitable manner, comprises a tin $e$ or other suitable receptacle, for methylated spirit or other fuel, having a nipple $f$ on top to which is screwed or otherwise attached a vessel $g$ or chamber having fine lateral holes $h$ therein through which the vapor jets (indicated by the lines $i$) issue to be burned. Supported from the receptacle by lower hook-like members or other means is a wire cradle or other device by means of which the burner may be suspended beneath the vaporizer. The burner comprises a receptacle $k$ for the fuel and a device $l$ comprising two, three, or more wicks of different lengths such that they project to varying extents into the fuel with the result that after predetermined periods of time the respective wicks are automatically put out of action as the level of the fuel drops, the arrangement being such that when the balloon has risen to a predetermined height only just sufficient heat is produced to maintain the balloon at that height, it being obvious that any desired variation in the size, length and number of the wicks may be introduced.

To facilitate the starting of the device when the balloon is rising from the ground, the burner is surrounded by an aluminium foil or other wind-screen $m$ and this in turn is preferably surrounded by a longer screen or sleeve $n$ of tissue paper impregnated with fire-resisting medium or of other material, the screen being preferably mounted upon rings so that it may be collapsed to be around the wind-screen, and extended only when it is required for use. The ring $n'$ supporting the wind-screens is shown in Fig. 5.

When it is desired that the fire balloon may be illuminated as, for example, for night work, I combine therewith a suitable source of illumination (Fig. 3) which may take the form of an acetylene lamp comprising for example, two metal vessels $o$ $p$, one above the other and provided with a restricted portion $q$ connecting the two vessels through which the cotton wick or other drip device is passed, while there is also a by-pass tube $r$ (Fig. 4) extending from the lower vessel in which the carbid is stored into the upper part of the upper vessel (into the lower part of which the water is inserted), the function of the by-pass being to allow the escape of the gas to the jet or nozzle burner of suitable form which may be mounted or formed in the upper part of the upper vessel. This burner may also be supported or suspended from the foundation ring of the balloon, being arranged at one side of the support for the heating apparatus.

Any convenient form of reflector $s$ or diffuser may be provided in conjunction with the source of illumination, and it is to be understood that the foregoing details of construction are given by way of example only and may be suitably modified to suit the type and construction of device that is required and the purpose for which it is to be employed.

Furthermore, in place of employing a plurality of wicks, as above described, I may adopt any other suitable method or means for successively reducing the amount of heat supplied by the heating apparatus for the purpose of adjusting the height to which the balloon will rise. Thus, for example, I may employ two or more hydrocarbons with different boiling points, say, for example, petrol and alcohol, in which case the petrol flame will be much hotter than the alcohol flame which follows when the petrol has all been burnt.

Figs. 10 to 14 show a modified form of burner that may be employed with advantage. In this form the main burner $e$ supports the wind-screen $m$ which in turn supports the heating lamp $k$ as shown in Figs. 10 and 12. The screen may be snapped into position as shown in Fig. 14.

The main burner is shown in two separate forms in Figs. 11 and 13, in each of which there is shown a central tube $t$ having the vapor holes $h$ in the upper part thereof and lower holes $u$ to equalize the pressures within the tube and main receptacle $e$, the tube being adapted to pass through and to be secured to a cap $v$ upon the main receptacle and being surmounted by a baffle or deflector $w$ and surrounded by a guard or screen $x$.

In the form shown in Fig. 13 the cap $v$ is also provided with apertures through which the vapor may issue so as to insure that the upped jets do not blow out.

In Fig. 11 this effect is produced by the lower row of holes being arranged to strike the top of the guard $x$.

Duplex wire coils $z$ or rolls of gauze or pads of steel wool may be provided in conjunction with the burner, pads, 1, of steel wool being also preferably provided where shown.

Fig. 15 shows a wire starting frame, 2, supported by the uprights, 3, from which the balloon may be released, one part of an alternative frame being shown in Fig. 16. In either form the balloon is supported upon the frame by wire loops or the like upon the balloon casing so positioned that the foundation ring with burner supported thereon hangs down well below the starting frame upon which the upper part of the casing rests, so that there will be no fear of the casing catching fire.

Fig. 17 illustrates one convenient mode in which the uprights of the starting frame may be packed upon the inside of the lid of the box containing the balloon and its accessories.

Fig. 18 shows a burner comprising a tube 4, of copper or other high conductivity material, which passes from the lower part of the reservoir $e$ up through the cap $v$ and at its upper part is bent into a ring 5 (in the horizontal plane as shown in Figs. 18 and 19, or in the vertical as shown in Fig. 20, or in any other suitable plane), the tube then descending and being coiled around the uptake part of the pipe as shown at 6 and 7. The coiled parts 6 and 7 are provided with apertures and the other end 8 of the pipe is blocked by pinching at 9 or otherwise and may or may not be provided with a wick. The reservoir and the ring 5 being both heated, the pressure causes the liquid to rise from the reservoir $e$ into the ring 5 where it is completely vaporized and is burnt as it issues from the holes $h$.

Having now described my invention what I claim as new and desire to secure by Letters Patent is:—

1. A fire balloon of the type referred to, provided with a heating device comprising a reservoir for liquid fuel, and having fine apertures through which the vapor of such fuel may issue to be burnt as it emerges, and a burner external to but in association with, said reservoir, and having a plurality of wicks of varying lengths, substantially as described.

2. A fire balloon of the type referred to, comprising a casing having a frame and provided with a heating device comprising a reservoir for liquid fuel and having fine apertures through which the vapor of such fuel may issue to be burnt as it emerges, a burner, external to but in association with, said reservoir, and an illuminating apparatus supported by said casing and frame, substantially as described.

3. A fire balloon of the type referred to, comprising a casing provided with a heating device comprising a reservoir for liquid fuel and having a plurality of fine apertures through which the vapor of such fuel may issue to be burnt as it emerges, a burner, external to but in association with, said reservoir, and having a plurality of wicks, and an illuminating apparatus suspended beneath the casing at one side of the heating device, substantially as described.

4. A fire balloon of the type referred to, comprising a casing provided with a heating device comprising a reservoir for liquid fuel and provided with fine apertures through which the vapor of such fuel may issue to be burnt as it emerges, a burner, external to but in association with, said reservoir, and a wind screen in conjunction with said burner and extending beneath the same, substantially as described.

In testimony whereof I have signed my name to this specification.

JOHN UNETT COATES.